(12) United States Patent
Dong (10) Patent No.: US 12,425,848 B2
(45) Date of Patent: Sep. 23, 2025

(54) MANAGEMENT FRAME TRANSMISSION METHOD, APPARATUS AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 254 days.

(21) Appl. No.: 17/919,072

(22) PCT Filed: Apr. 16, 2020

(86) PCT No.: PCT/CN2020/085154
§ 371 (c)(1),
(2) Date: Oct. 14, 2022

(87) PCT Pub. No.: WO2021/208025
PCT Pub. Date: Oct. 21, 2021

(65) Prior Publication Data
US 2023/0171594 A1   Jun. 1, 2023

(51) Int. Cl.
*H04L 9/00* (2022.01)
*H04W 12/037* (2021.01)
*H04W 12/06* (2021.01)

(52) U.S. Cl.
CPC ......... *H04W 12/037* (2021.01); *H04W 12/06* (2013.01)

(58) Field of Classification Search
CPC ..... H04W 12/037; H04W 12/06; H04W 4/06; H04W 12/02; H04W 12/03; H04W 12/033; H04W 12/04; H04W 12/041; H04W 12/0433; H04W 12/50; H04L 1/00
See application file for complete search history.

(56) References Cited

U.S. PATENT DOCUMENTS

| 7,885,410 | B1 | 2/2011 | Meier et al. |
| 10,271,215 | B1 * | 4/2019 | Siraj .................... H04W 12/03 |
| 2004/0240412 | A1 | 12/2004 | Winget |
| 2007/0280169 | A1 | 12/2007 | Cam Winget |
| 2020/0077258 | A1 * | 3/2020 | Doyle ................. H04L 63/0428 |

FOREIGN PATENT DOCUMENTS

| CN | 1503595 A | 6/2004 |
| CN | 1836404 A | 9/2006 |
| CN | 101073221 A | 11/2007 |
| CN | 101114957 A | 1/2008 |
| CN | 101986726 A | 3/2011 |
| CN | 106603226 A | 4/2017 |
| CN | 107846685 A | 3/2018 |

(Continued)

OTHER PUBLICATIONS

NPL 4-Way Handshake (Year: 2019).*
(Continued)

*Primary Examiner* — Syed M Ahsan
(74) *Attorney, Agent, or Firm* — Volpe Koenig (57) ABSTRACT

A management frame transmission method is applicable to a first device. The management frame transmission method includes: generating a management frame; encrypting the management frame with a unicast session key; and sending the encrypted management frame.

18 Claims, 6 Drawing Sheets

(56) References Cited

FOREIGN PATENT DOCUMENTS

WO 2007/000179 A1 1/2007
WO 2012/055204 A1 5/2012

OTHER PUBLICATIONS

4-Way Handshake (Year: 2019).*
International Search Report Issued in Application No. PCT/CN2020/085154, Jan. 15, 2021, 4 pages.
Čermák, Milo, et al., "Serious Vulnerability Deep Inside Your Wi-Fi Encryption," Krook—CVE-2019-15126, Feb. 2020, 11 pages.
Gao, Yang, "The Research of Strengthening WLAN Security With Certificates," Shandong University Master's Thesis, Apr. 15, 2008, 96 pages.
State Intellectual Property Office of the People's Republic of China, Office Action and Search Report Issued in Application No. 202080000763X, May 31, 2023, 12 pages.(Submitted with Machine/Partial Translation).
ISA State Intellectual Property Office of the People's Republic of China, Written Opinion of the International Searching Authority Issued in Application No. PCT/CN2020/085154, Jan. 15, 2021, WIPO, 7 pages.
State Intellectual Property Office of the People's Republic of China, Office Action and Search1 Application No. 202080000763.X, Jan. 24, 2024, 16 pages.

* cited by examiner

MANAGEMENT FRAME TRANSMISSION METHOD, APPARATUS AND STORAGE MEDIUM

CROSS-REFERENCE TO RELATED APPLICATION

This application is the U.S. national phase application of International Application No. PCT/CN2020/085154, filed on Apr. 16, 2020, the disclosure of which is incorporated herein by reference in its entirety for all purposes.

TECHNICAL FIELD

The present disclosure relates to the field of communication technology, and in particular to a management frame transmission method, apparatus and storage medium.

BACKGROUND

In Wireless Local Area Network (WLAN) technologies such as Wireless Fidelity (Wi-Fi), a management frame is transmitted with a transparent destination address and a transparent source address but without being encrypted. Therefore, it is easy for an attacker to fabricate a spoofed management frame and send it to an attacked person. For example, one or more management frames such as a reassociation frame and a disassociation frame may be transmitted during establishing a connection between a station and an access point. The attacker can fabricate a spoofed disassociation frame. After the attacked person receives the spoofed disassociation frame, data buffered before disassociation is to be encrypted with all-zero temporal key (TK) or all-zero key encryption key (KEK) and is transmitted by the attacked person. The data frames transmitted after being encrypted with the all-zero TK/KEK can be captured and decoded by the attacker, which further causes that sensitive data is captured by the attacker.

SUMMARY

In order to overcome the above problem in the related art, the present disclosure provides a management frame transmission method, apparatus and storage medium.

According to a first aspect of embodiments of the present disclosure, a management frame transmission method is provided. The management frame transmission method is applicable to a first device and includes: generating a management frame; encrypting the management frame with a unicast session key; and sending the encrypted management frame.

According to a second aspect of embodiments of the present disclosure, a management frame transmission method is provided. The management frame transmission method is applicable to a second device and includes: receiving a management frame encrypted with a unicast session key; and sending a confirmation message which indicates that the second device has received the management frame.

According to a third aspect of embodiments of the present disclosure, a management frame transmission apparatus is provided and includes: one or more processors; and a memory for storing instructions executable by the one or more processors. The one or more processors are configured to perform the management frame transmission method described in the first aspect or any one implementation thereof.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The management frame transmission methods provided by the examples of the present disclosure are applicable to a communication system in a wireless local area network. The communication system includes a data sending device and a data receiving device. The data sending device and the data receiving device may be a station (STA) or an access point (AP). Forward transmissions and back transmissions of data are performed between the data sending device and the data receiving device through the wireless local area network.

The STA in the present disclosure may be understood as a user terminal in the wireless local area network. The user terminal, which may be called user equipment (UE), mobile station (MS), mobile terminal (MT), etc., is such a device that provides users with voice and/or data connectivity. For example, the terminal may be a handheld device with a wireless connection function, a vehicle-mounted device with a wireless connection function, and the like. At present, some examples of the terminal include a mobile phone, a pocket personal computer (PPC), a handheld computer, a personal digital assistant (PDA), a notebook computer, a tablet computer, a wearable device, an Internet of Things (IoT) client, a vehicle-mounted device, or the like.

The AP in the present disclosure refers to a device by which the user terminal of the wireless local area network accesses to the network, a router, etc.

Figure 1:
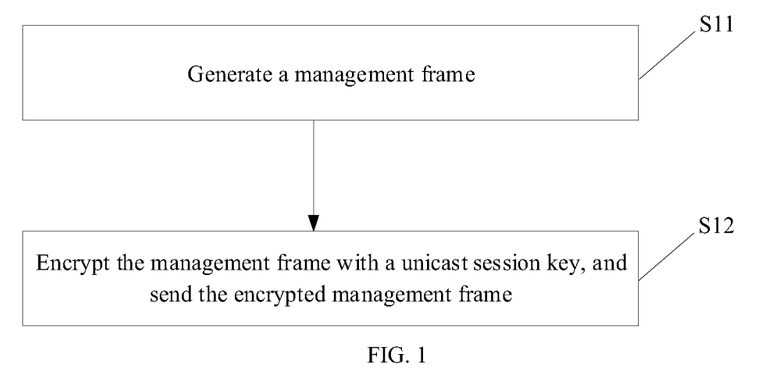
FIG. 1 illustrates a flow chart of a management frame transmission method according to an example.

FIG. 1 illustrates a flow chart of a management frame transmission method according to an example. As illustrated in FIG. 1, the management frame transmission method is applied in a first device. The first device may be a station or an AP. As illustrated in FIG. 1, the management frame transmission method includes the following steps.

At step S11, a management frame is generated.

In the example of the present disclosure, the management frame is generated when the first device is to communicate and transmit data frames with other devices. The management frame may be used to manage and control the data frames. For example, the management frame may be a reassociation request frame sent by the station to the AP. Alternatively or additionally, the management frame may be a disassociation frame or a deauthentication frame sent by the AP to the station.

At step S12, the management frame is encrypted with a unicast session key, and the encrypted management frame is sent.

In the example of the present disclosure, when the first device as a sender of the management frame is to send the management frame, the unicast session key (for example, a temporal key, TK) is adopted to encrypt the management frame for transmission, so as to lower a successful rate that an attacker fabricates a spoofed management frame, which improves the security of transmitting the management frame, thereby preventing sensitive data from being captured by the attacker.

In the example of the present disclosure, the unicast session key adopted to encrypt the management frame may be the key used to encrypt unicast data frames. For example, in one or more examples of the present disclosure, a reassociation request frame, a disassociation frame or a deauthentication frame is encrypted with the unicast session key adopted before disassociation or reassociation and is transmitted.

In the example of the present disclosure, when the management frame is encrypted with the unicast session key and is transmitted, the unicast session key may be negotiated through a four-way handshake, and the unicast session key negotiated through the four-way handshake is adopted to encrypt the management frame for transmission, so as to improve the security.

Figure 2:
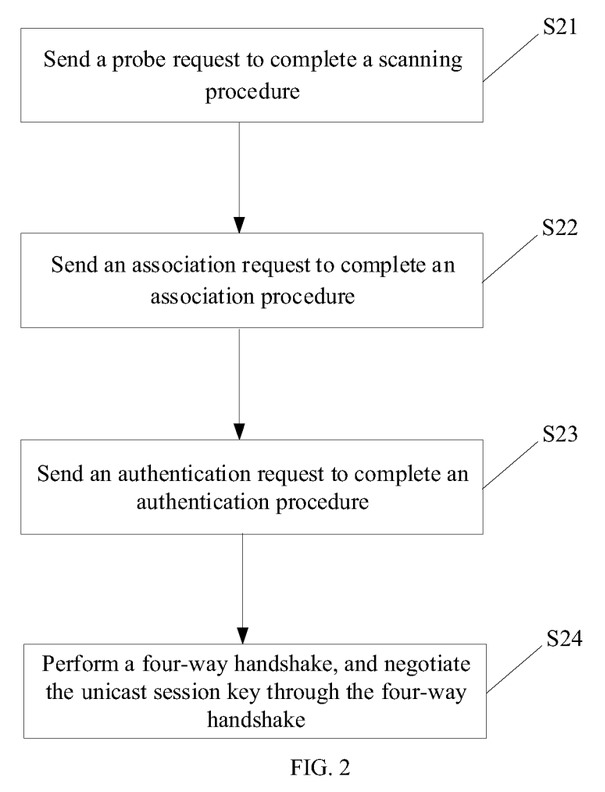
FIG. 2 illustrates a schematic diagram of a process of negotiating a unicast session key according to an example.

FIG. 2 illustrates a schematic diagram of a process of negotiating a unicast session key according to an example. Referring to FIG. 2, the process of negotiating the unicast session key includes the following steps.

At step S21, a probe request is sent to complete a scanning procedure.

At step S22, an association request is sent to complete an association procedure.

At step S23, an authentication request is sent to complete an authentication procedure.

At step S24, a four-way handshake is performed, and the unicast session key is negotiated through the four-way handshake.

After negotiating the unicast session key through the four-way handshake in the example of the present disclosure, the unicast session key negotiated through the four-way handshake may be adopted to encrypt the management frame, so as to improve the security of transmitting the management frame.

Further, the unicast session key negotiated through the four-way handshake in the example of the present disclosure is determined under a pseudo-random function (PRF). PRF is related to a random number, an init counter, a local media access control (MAC) address, time, etc. (According to IEEE 802.11i PRF, PRF (Random Number, "InitCounter", MAC∥Time, Len) is defined. For example, the PRF is called PRF-256 with the Len is equal to 256.) The PRF is strongly associated with the local Mac address. The local Mac address may be represented by a bitmap. Therefore, the unicast session key negotiated through the four-way handshake in the example of the present disclosure should be understood as being determined based on the local MAC address of the first device. In the example of the present disclosure, the management frame is encrypted with the unicast session key determined based on the local MAC address of the first device, so that the unicast session key is unique, which improves the security of transmitting the management frame.

Furthermore, the unicast session key in the example of the present disclosure is configured with a validity period, so that the unicast session key is valid within the validity period, which further improves the security of transmitting the management frame.

In one or more examples of the present disclosure, after the first device encrypts with the unicast session key and sends the management frame, a management frame receiver receives the management frame encrypted with the unicast session key. For the convenience of description in the examples of the present disclosure, the management frame receiver is called a second device. The second device may be an AP or a station.

Figure 3:
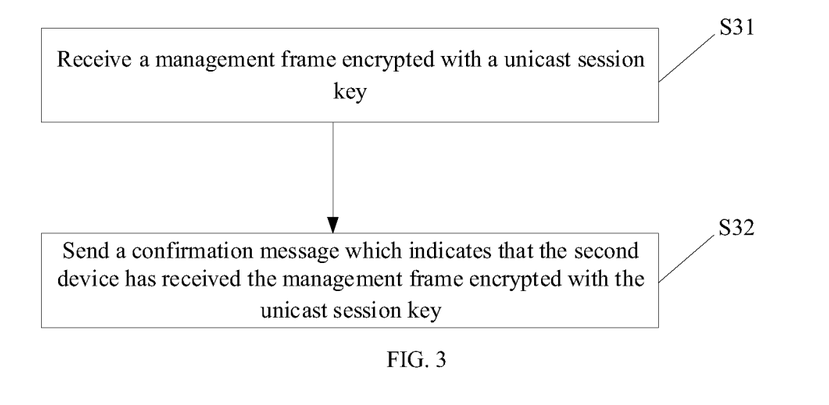
FIG. 3 illustrates a flow chart of a management frame transmission method according to an example.

FIG. 3 illustrates a flow chart of a management frame transmission method according to an example. As illustrated in FIG. 3, the management frame transmission method is applied in the second device that may be the station or the AP. As illustrated in FIG. 3, the management frame transmission method includes the following steps.

At step S31, a management frame encrypted with a unicast session key is received.

In particular, the unicast session key adopted for encrypting the management frame received by the second device is negotiated through a four-way handshake between a first device and the second device.

Further, the unicast session key negotiated through the four-way handshake between the first device and the second device is determined based on a local MAC address of the first device. Furthermore, the unicast session key negotiated through the four-way handshake between the first device and the second device is configured with a validity period.

In the example of the present disclosure, the management frame received by the second device may be a reassociation request frame, a disassociation frame, or a deauthentication frame.

Further, in the example of the present disclosure, after receiving the management frame encrypted with the unicast session key, the second device may decrypt the management frame with the unicast session key. For example, the first device encrypts the management frame with the unicast session key negotiated through the four-way handshake between the first device and the second device, and sends it to the second device. The second device receives the management frame which is encrypted with the unicast session key and transmitted, and decrypts the received management frame with the unicast session key negotiated through the four-way handshake with the first device.

At step S32, a confirmation message is sent. The confirmation message indicates that the second device has received the management frame encrypted with the unicast session key.

In the example of the present disclosure, the second device receives the management frame encrypted with the unicast session key and sent by the first device, and sends the confirmation message to the first device after confirming the receipt of the management frame encrypted with the unicast session key, so as to indicate that the second device has received the management frame encrypted with the unicast session key.

Further, in the example of the present disclosure, after the management frame receiver (the second device) receives the management frame encrypted with the unicast session key, the confirmation message fed back to the management frame sender (the first device) may be an Acknowledgement (ACK) frame or another response frame. For example, the management frame includes the disassociation frame or the deauthentication frame, and the confirmation message sent by the management frame receiver includes the ACK frame; the management frame includes the reassociation request frame, and the confirmation message sent by the management frame receiver includes a reassociation response frame.

In one implementation of the example of the present disclosure, after transmitting the management frame encrypted with the unicast session key, the management frame sender (the first device) may determine whether the management frame receiver is a receiver that should have received the management frame or not. When the management frame receiver is the receiver that should have received the management frame, the management frame sender may encrypt with the unicast session key and transmit subsequent data to be sent. When the management frame receiver is not the receiver that should have received the management frame, the management frame sender may discard the subsequent data to be sent.

Whether the management frame receiver is the receiver that should have received the management frame or not may be determined by the management frame sender based on the received confirmation message sent by the management frame receiver (the second device). For example, the confirmation message includes a device identification of the second device, so that the management frame sender (the first device) determines whether the second device is the receiver that should have received the management frame based on the device identification of the second device.

In one example of the present disclosure, it is taken as an example for description that the management frame includes the disassociation frame.

Figure 4:
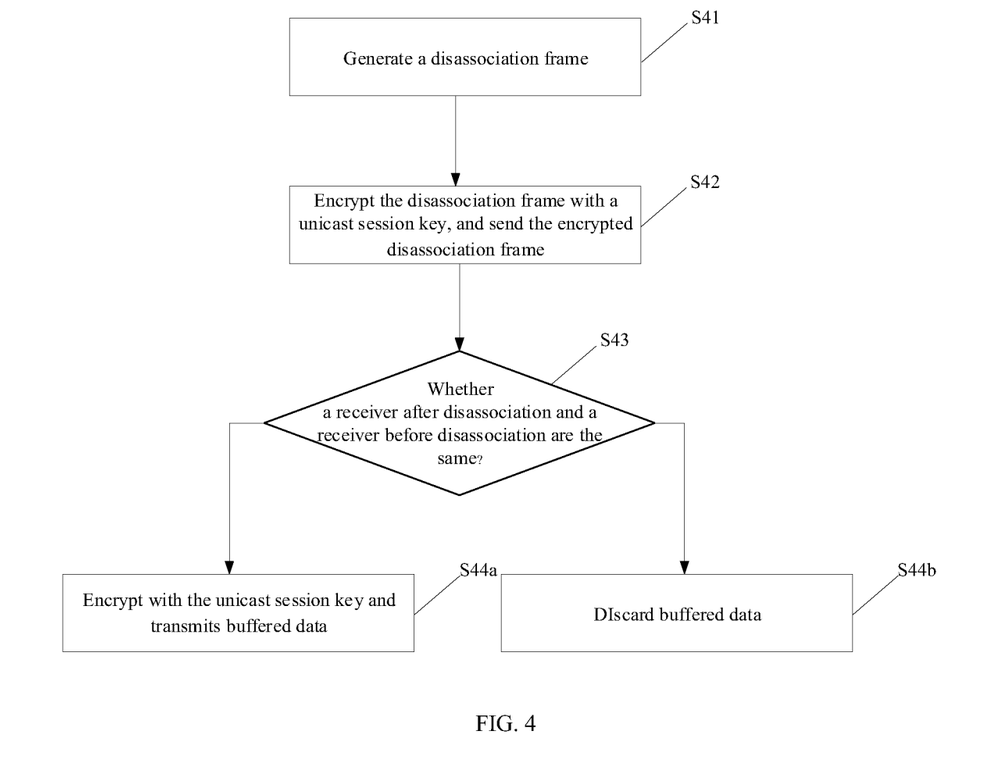
FIG. 4 illustrates a flow chart of a management frame transmission method according to an example.

FIG. 4 illustrates a flowchart of a management frame transmission method shown in the example of the present disclosure. Referring to FIG. 4, the management frame transmission method is applied in a first device. The first device may be a station or an AP. As illustrated in FIG. 4, the management frame transmission method includes the following steps.

At step S41, a disassociation frame is generated.

In the example of the present disclosure, the disassociation frame may be sent by the AP to the station.

At step S42, the disassociation frame is encrypted with a unicast session key, and the encrypted disassociation frame is sent.

At step S43, it is determined whether a receiver after disassociation and a receiver before disassociation are the same.

In one example of the present disclosure, the management frame includes the disassociation frame, step S44a is performed when the receiver after disassociation is the same as the receiver before disassociation, and step S44b is performed when the receiver after disassociation is different from the receiver before disassociation.

At step S44a, the management frame sender (the first device) encrypts with the unicast session key and transmits buffered data, and the management frame receiver (the second device) receives the buffered data that is encrypted with the unicast session key and transmitted by the management frame sender.

At step S44b, the management frame sender (the first device) discards the buffered data.

In the example of the present disclosure, the data buffered for the first device is encrypted and transmitted after a new session key TK is generated, which can further improve the security of transmitting the data. When the new receiver after disassociation is different from the receiver before disassociation, the first device directly discards the data, which can also prevent the buffered data from being obtained by the attacker, thereby improving the data security.

It should be understood that the management frame transmission methods provided by the examples of the present disclosure may be applied in an interaction implementation process between the management frame sender (the first device) and the management frame receiver (the second device).

Figure 5:
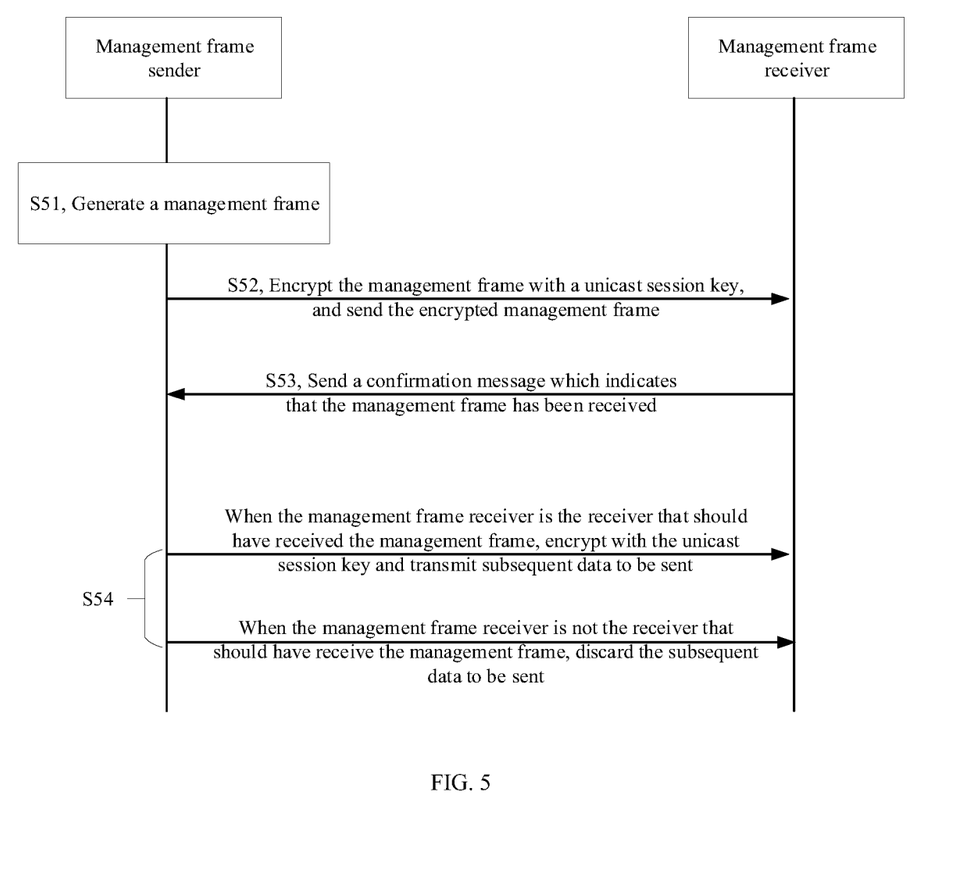
FIG. 5 illustrates a flow chart of a management frame transmission method according to an example.

FIG. 5 illustrates a flowchart of a management frame transmission method shown in one example of the present disclosure. Referring to FIG. 5, the management frame transmission method is applied in the interaction implementation process between a management frame sender (a first device) and a management frame receiver (a second device). As shown in FIG. 5, the management frame transmission method includes the following steps.

At step S51, the management frame sender generates a management frame.

The management frame includes a reassociation request frame, a disassociation frame, or a deauthentication frame.

At step S52, the management frame sender encrypts with a unicast session key and sends the management frame, and the management frame receiver receives the management frame encrypted with the unicast session key and transmitted.

The unicast session key is negotiated through a four-way handshake. The management frame receiver encrypts the management frame with the unicast session key negotiated through the four-way handshake.

In one example, the unicast session key is determined based on a local MAC address of the management frame sender. The unicast session key is configured with a validity period.

At step S53, the management frame receiver sends a confirmation message which indicates that the management frame has been received. The management frame sender receives the confirmation message.

In particular, the management frame includes the disassociation frame or the deauthentication frame, and the confirmation message includes an ACK frame; the management frame includes the reassociation request frame, and the confirmation message includes a reassociation response frame.

At step S54, the management frame sender determines whether the management frame receiver is a receiver that should have received the management frame. When the management frame receiver is the receiver that should have received the management frame, the management frame sender may encrypt with the unicast session key and transmit subsequent data to be sent. When the management frame receiver is not the receiver that should have received the management frame, the management frame sender may discard the subsequent data to be sent.

The management frame transmission methods that are applicable to the first device or the second device in the above examples may be applied in the process that the management frame sender and the management frame receiver interact with each other for implementing the management frame transmission in the examples of the present disclosure. The relevant description of the above examples may be referred for any insufficiency of this example.

According to the examples of the present disclosure, by encrypting with a unicast session key and transmitting a management frame, the security of transmitting the management frame can be improved, which prevents sensitive data from being captured by an attacker.

Some examples of the present disclosure also provide a management frame transmission apparatus based on the same concept.

It should be understood that, the management frame transmission apparatus provided in the examples of the present disclosure includes hardware structures and/or software modules for performing various corresponding functions, so as to implement the above functions. By combining various illustrated units and algorithm steps thereof disclosed in the examples of the present disclosure, these examples of the present disclosure can be implemented in a form of hardware or in a form of combining hardware and computer software. Whether a certain function is performed by hardware or in a way that hardware is driven by computer software depends on a specific application and design constraint conditions of a technical solution. Those skilled in the art may adopt a different method for each specific application to implement the described functions, which, however, should not be considered as beyond the scope of the technical solutions provided by the examples of the present disclosure.

Figure 6:
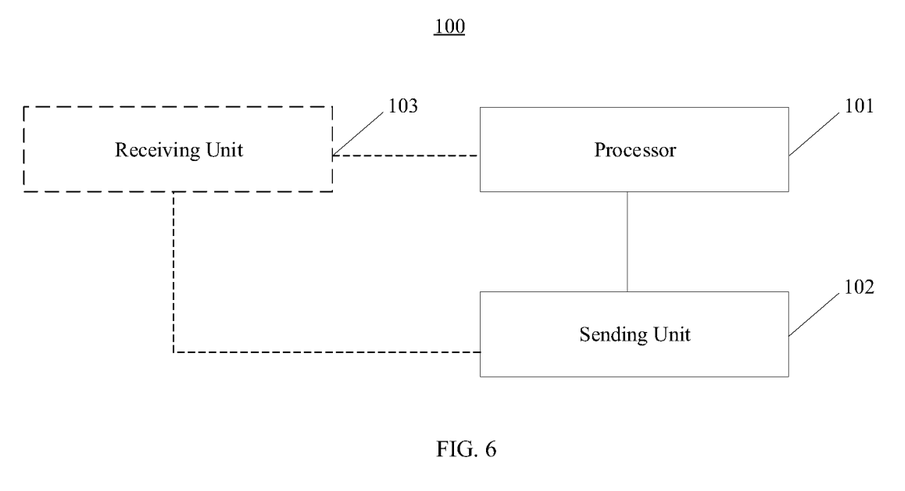
FIG. 6 illustrates a block diagram of a management frame transmission apparatus according to an example.

FIG. 6 illustrates a block diagram of a management frame transmission apparatus according to an example. Referring to FIG. 6, the management frame transmission apparatus 100 is applicable to a first device, and includes a processor 101 and a sending unit 102. The processor 101 is configured to generate a management frame. The sending unit 102 is configured to encrypt the management frame with a unicast session key and send the encrypted management frame.

In one implementation, the sending unit 102 is configured to encrypt the management frame with the unicast session key by: sending a probe request, an association request and an authentication request; performing a four-way handshake; negotiating the unicast session key through the four-way handshake; and encrypting the management frame with the unicast session key.

In another implementation, the unicast session key is determined based on a local MAC address of the first device.

In another implementation, the unicast session key is configured with a validity period.

In another implementation, the management frame includes a reassociation request frame, a disassociation frame, or a deauthentication frame.

In another implementation, the management frame transmission apparatus 100 further includes a receiving unit 103 that is configured to receive a confirmation message fed back by a second device. The confirmation message indicates that the second device has received the management frame.

In another implementation, the management frame includes the disassociation frame or the deauthentication frame, and the confirmation message includes an ACK frame.

In another implementation, the management frame includes the reassociation request frame, and the confirmation message includes a reassociation response frame.

In another embodiment, the management frame includes the disassociation frame. When a receiver after disassociation is the same as a receiver before disassociation, the sending unit 102 is further configured to encrypt with the unicast session key and transmit buffered data.

In another embodiment, the management frame includes the disassociation frame. When the receiver after disassociation is different from the receiver before disassociation, the sending unit 102 is further configured to discard the buffered data.

Figure 7:
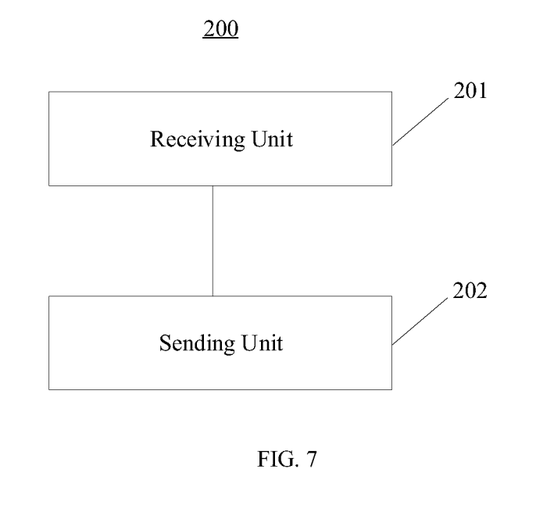
FIG. 7 illustrates a block diagram of a management frame transmission apparatus according to an example.

FIG. 7 illustrates a block diagram of a management frame transmission apparatus according to one example. Referring to FIG. 7, the management frame transmission apparatus 200 is applicable to a second device. The management frame transmission apparatus 200 includes a receiving unit 201 and a sending unit 202. The receiving unit 201 is configured to receive a management frame encrypted with a unicast session key. The sending unit 202 is configured to send a confirmation message which indicates that the second device has received the management frame.

In one implementation, the unicast session key is negotiated through a four-way handshake. The receiving unit 201 is further configured to decrypt the management frame with the unicast session key negotiated through the four-way handshake.

In another implementation, the unicast session key is determined based on a local MAC address of a first device.

In another implementation, the unicast session key is configured with a validity period.

In another implementation, the management frame includes a reassociation request frame, a disassociation frame, or a deauthentication frame.

In another implementation, the management frame includes the disassociation frame or the deauthentication frame, and the confirmation message includes an ACK frame.

In another implementation, the management frame includes the reassociation request frame, and the confirmation message includes a reassociation response frame.

In another implementation, the management frame includes the disassociation frame, and the receiving unit 201 is further configured to receive buffered data transmitted by encrypting with the unicast session key.

With respect to the apparatuses in the foregoing examples, the specific manner in which each module performs its operation has been described in detail in the examples of the related methods, and will not be further elaborated here.

Figure 8:
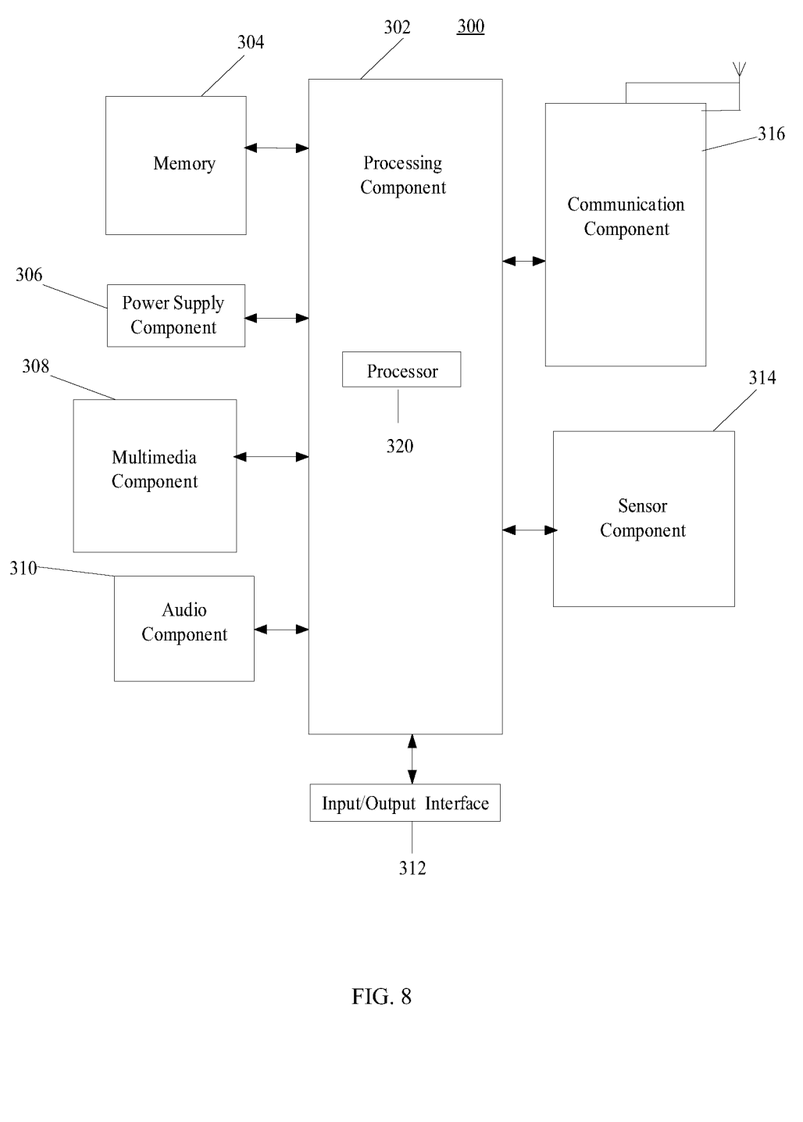
FIG. 8 illustrates a block diagram of an apparatus for management frame transmission according to an example.

FIG. 8 illustrates a block diagram of an apparatus 300 for management frame transmission according to one example. For example, the apparatus 300 may be a mobile phone, a computer, a digital broadcasting user device, a messaging device, a game console, a tablet device, a medical device, a fitness device, a personal digital assistant, and the like.

Referring to FIG. 8, the apparatus 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls the overall operations of the apparatus 300, such as operations associated with display, phone calls, data communications, camera operations, and recording operations. The processing component 302 may include one or more processors 320 to execute instructions to complete all or a part of the steps of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operations of the apparatus 300. Examples of such data include instructions for any application or method operated on the apparatus 300, contact data, phonebook data, messages, pictures, videos, and the like. The memory 304 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 306 provides power for various components of the apparatus 300. The power supply component 306 may include a power management system, one or more power supplies, and other components associated with generating, managing, and distributing power for the apparatus 300.

The multimedia component 308 includes a screen providing an output interface between the apparatus 300 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 308 includes a front camera and/or a rear camera. The front camera and/or rear camera may receive external multimedia data when the apparatus 300 is in an operating mode, such as a photographing mode or a video mode. Each front camera and rear camera may be a fixed optical lens system or have focal length and optical zooming capability.

The audio component 310 is configured to output and/or input an audio signal. For example, the audio component 310 includes a microphone (MIC) that is configured to receive an external audio signal when the apparatus 300 is in an operating mode, such as a call mode, a recording mode, and a voice recognition mode. The received audio signal may be further stored in memory 304 or transmitted via communication component 316. In some examples, the audio component 310 also includes a speaker for outputting an audio signal.

The I/O interface 312 provides an interface between the processing component 302 and a peripheral interface module. The above peripheral interface module may be a keyboard, a click wheel, buttons, or the like. These buttons may include but not be limited to a home button, a volume button, a start button and a lock button.

The sensor component 314 includes one or more sensors to provide the apparatus 300 with status assessments in various aspects. For example, the sensor component 314 may detect an open/closed state of the apparatus 300 and a relative positioning of components such as the display and keypad of the apparatus 300, and the sensor component 314 may also detect a change in position of the apparatus 300 or a component of the apparatus 300, the presence or absence of user contact with the apparatus 300, orientation or acceleration/deceleration of the apparatus 300, and temperature change of the apparatus 300. The sensor component 314 may include a proximity sensor configured to detect the presence of a nearby object without any physical contact. The sensor component 314 may further include an optical sensor, such as a Complementary Metal-Oxide-Semiconductor (CMOS) or Charged Coupled Device (CCD) image sensor, for being applied in imaging applications. In some examples, the sensor component 314 may also include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 2G, 3G or a combination thereof. In one example, the communication component 316 receives broadcast signals or broadcast related information from an external broadcast management system via a broadcast channel. In an example, the communication component 316 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the apparatus 300 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronics to perform the foregoing methods.

In one or more examples, there is also provided a non-transitory computer-readable storage medium including instructions, such as the memory 304 including instructions. These instructions may be executed by the one or more processors 320 of the apparatus 300 to complete the foregoing methods. For example, the non-transitory computer-readable storage medium may be a read-only memory (ROM), a random access memory (RAM), a CD-ROM, a magnetic tape, a floppy disk, an optical data storage device, and the like.

Figure 9:
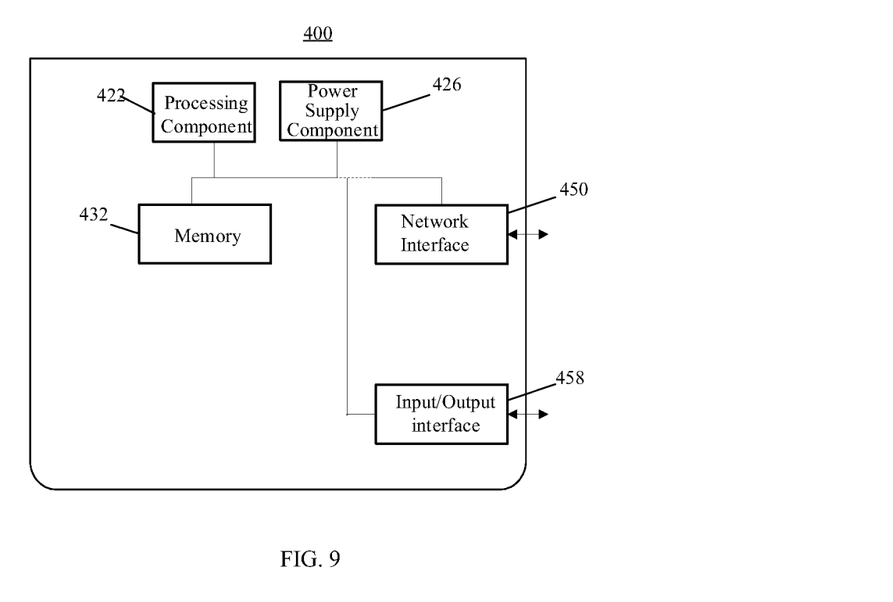
FIG. 9 illustrates a block diagram of an apparatus for management frame transmission according to an example.

FIG. 9 illustrates a block diagram of an apparatus 400 for management frame transmission according to one example. For example, the apparatus 400 may be provided as a server. Referring to FIG. 9, the apparatus 400 includes a processing component 422 which further includes one or more processors, and a memory resource represented by a memory 432 which is used to store instructions that may be executed by the processing component 422, such as application programs. The application programs stored in the memory 432 may include one or more modules, each of which corresponds to a set of instructions. In addition, the processing component 422 is configured to execute the instructions to perform the foregoing methods.

The apparatus 400 may also include a power supply component 426 configured to perform power management for the apparatus 400, a wired or wireless network interface 450 configured to connect the apparatus 400 to a network, and an input/output (I/O) interface 458. The apparatus 400 may operate based on an operating system stored in the memory 432, for example, Windows, Server™, Mac OS X™, Unix™, Linux™, FreeBSD™ or the like.

In an example, there is also provided a non-transitory computer-readable storage medium including instructions, such as the memory 432 including instructions. These instructions may be executed by the processing component 422 of the apparatus 400 to complete the foregoing methods. For example, the non-transitory computer-readable storage medium may be an ROM, an RAM, a CD-ROM, a magnetic tape, a floppy disk, an optical data storage device, and the like.

It should be further understood that the term "plurality" in the present disclosure refers to two or above, and other quantifiers are similar. The term "and/or" describes the association relationships between associated objects, indicating that there can be three types of relationships. For example, A and/or B means that A exists alone, A and B exist at the same time, and B exists alone. The character "/" generally indicates that the associated objects before and after are in an "or" relationship. The singular forms "a", "said" and "the" are also intended to include plurality, unless clearly indicated otherwise in the context.

It should be further understood that the terms "first", "second", etc. are used to describe various information, but such information should not be limited to these terms. These terms are only used to distinguish information of the same category with each other, without indicating a specific order or an importance. In fact, the expressions such as "first" and "second" may be used interchangeably. For example, without departing from the scope of the present disclosure, first information may be referred as second information; and similarly, second information may also be referred as first information.

It should be further understood that although being described in a specific order in the drawings, the operations in the examples of the present disclosure should not be understood as requiring these operations to be performed in the specific order or in a serial order as shown, or requiring the operations to be completely performed as shown to get a desired result. In certain circumstances, multitasking and parallel processing may be advantageous.

The technical solutions provided by the embodiments of the present disclosure may include the following beneficial effects: by encrypting with a unicast session key and transmitting a management frame, the security of transmitting the management frame can be improved, which prevents sensitive data from being captured by an attacker.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A management frame transmission method, performed by a processor of a first device in a wireless local area network, wherein forward transmissions and back transmissions of data are performed between the first device and a second device through the wireless local area network, the first device comprises a first station (STA) or a first access point (AP), and the second device comprises a second AP or a second STA, the method comprising:
   negotiating, through a physical layer interface, a unicast session key with the second device through a four-way handshake to select a negotiated unicast session key;
   encrypting, in a media access control (MAC) layer, a management frame with the negotiated unicast session key to form an encrypted management frame, wherein the management frame is generated in the MAC layer, and the management frame comprises a reassociation request frame, a disassociation frame, or a deauthentication frame;
   sending, through the physical layer interface, the encrypted management frame;
   determining, in the MAC layer, whether a management frame receiver is the second device,
   in a case that the management frame receiver is the second device, encrypting with the unicast session key, in the MAC layer, subsequent data to be sent and transmitting, through the physical layer interface, the subsequent data, and
   in a case that the management frame receiver is not the second device, discarding, in the MAC layer, the subsequent data to prevent the data from being captured by an attacker.

2. The management frame transmission method according to claim 1, further comprising:
   sending, through the physical layer interface, a probe request, an association request and an authentication request;
   performing, through the physical layer interface, the four-way handshake with the second device.

3. The management frame transmission method according to claim 1, wherein the unicast session key is determined based on a local MAC address of the first device.

4. The management frame transmission method according to claim 3, wherein the unicast session key is configured with a validity period.

5. The management frame transmission method according to claim 1, further comprising:
   receiving a confirmation message fed back by the management frame receiver, wherein the confirmation message indicates that the second device has received the management frame.

6. The management frame transmission method according to claim 5, wherein the management frame comprises the disassociation frame or the deauthentication frame, and the confirmation message comprises an Acknowledgement (ACK) frame.

7. The management frame transmission method according to claim 5, wherein the management frame comprises the reassociation request frame, and the confirmation message comprises a reassociation response frame.

8. The management frame transmission method according to claim 1, wherein the management frame comprises the disassociation frame,
   determining, in the MAC layer, whether the management frame receiver is the second device comprises:

determining, in the MAC layer, a second receiver after disassociation and a first receiver before the disassociation are a same receiver, and encrypting with the unicast session key, in the MAC layer, subsequent data to be sent and transmitting, through the physical layer interface, the subsequent data comprises:

encrypting, in the MAC layer, buffered data with the unicast session key, and transmitting, through the physical layer interface, the buffered data.

9. A management frame transmission method, performed by a processor of a second device in a wireless local area network, wherein forward transmissions and back transmissions of data are performed between the second device and a first device through the wireless local area network, the first device comprises a first station (STA) or a first access point (AP), and the second device comprises a second AP or a second STA, the method comprising:

receiving, through a physical layer interface, a management frame encrypted with a unicast session key, wherein the management frame comprises a reassociation request frame, a disassociation frame, or a deauthentication frame;

negotiating, through the physical layer interface, a unicast session key with the first device through a four-way handshake to select a negotiated unicast session key;

sending, through the physical layer interface, a confirmation message which indicates that the second device has received the management frame for a determination of the first device; and receiving, through the physical layer interface, subsequent data encrypted with the unicast session key when the first device determines the confirmation message is sent by the second device, wherein the subsequent data is discarded to prevent the data from being captured by an attacker when the first device determines the confirmation message is not sent by the second device.

10. The management frame transmission method according to claim 9, further comprising: decrypting, in a media access control (MAC) layer, the management frame with the unicast session key.

11. The management frame transmission method according to claim 9, wherein the unicast session key is determined based on a local media access control (MAC) address of the first device.

12. The management frame transmission method according to claim 11, wherein the unicast session key is configured with a validity period.

13. The management frame transmission method according to claim 9, wherein the management frame comprises the disassociation frame or the deauthentication frame, and the confirmation message comprises an Acknowledgement (ACK) frame.

14. The management frame transmission method according to claim 9, wherein the management frame comprises the reassociation request frame, and the confirmation message comprises a reassociation response frame.

15. A management frame transmission apparatus, applicable to a first device in a wireless local area network, wherein forward transmissions and back transmissions of data are performed between the first device and a second device through the wireless local area network, the first device comprises a first station (STA) or a first access point (AP), and the second device comprises a second AP or a second STA, the apparatus comprising:

one or more processors; and a memory for storing instructions executable by the one or more processors;

wherein the one or more processors are configured to:

negotiate, through a physical layer interface, a unicast session key with the second device through a four-way handshake to select a negotiated unicast session key;

encrypt, in a media access control (MAC) layer, a management frame with the negotiated unicast session key to form an encrypted management frame, wherein the management frame is generated in the MAC layer, and the management frame comprises a reassociation request frame, a disassociation frame, or a deauthentication frame;

send, through the physical layer interface, the encrypted management frame;

determine, in the MAC layer, whether a management frame receiver is the second device, in a case that the management frame receiver is the second device, encrypt with the unicast session key, in the MAC layer, subsequent data to be sent and transmit, through the physical layer interface, the subsequent data, and in a case that the management frame receiver is not the second device, discard, in the MAC layer, the subsequent data to prevent the data from being captured by an attacker.

16. A management frame transmission apparatus, applicable to a second device in a wireless local area network, wherein forward transmissions and back transmissions of data are performed between the second device and a first device through the wireless local area network, the first device comprises a first station (STA) or a first access point (AP), and the second device comprises a second AP or a second STA, the apparatus comprising:

one or more processors; and a memory for storing instructions executable by the one or more processors; wherein the one or more processors are configured to perform the management frame transmission method according to claim 9.

17. A non-transitory computer-readable storage medium storing instructions that when executed by one or more processors of a station or an access point, enable the station or the access point to perform the management frame transmission method according to claim 1.

18. A non-transitory computer-readable storage medium storing instructions that when being executed by one or more processors of a station or an access point, enable the station or the access point to perform the management frame transmission method according to claim 9.

* * * * *